United States Patent
Kini et al.

(10) Patent No.: US 12,460,169 B2
(45) Date of Patent: Nov. 4, 2025

(54) BIOREACTOR SUPPORT SYSTEM

(71) Applicant: Global Life Sciences Solutions USA LLC, Marlborough, MA (US)

(72) Inventors: Prasad Kini, Bengaluru (IN); Shashikanth Agnihotry, Bengaluru (IN); Manoja Prabhu, Westborough, MA (US)

(73) Assignee: Global Life Sciences Solutions USA LLC, Marlborough, MA (US)

( * ) Notice: Subject to any disclaimer, the term of this patent is extended or adjusted under 35 U.S.C. 154(b) by 890 days.

(21) Appl. No.: 17/617,747

(22) PCT Filed: Jun. 17, 2020

(86) PCT No.: PCT/EP2020/066758
§ 371 (c)(1),
(2) Date: Dec. 9, 2021

(87) PCT Pub. No.: WO2020/260092
PCT Pub. Date: Dec. 30, 2020

(65) Prior Publication Data
US 2022/0251491 A1    Aug. 11, 2022

(30) Foreign Application Priority Data
Jun. 24, 2019   (IN) .............................. 201911025054

(51) Int. Cl.
*C12M 1/06* (2006.01)
*C12M 1/00* (2006.01)
*C12M 3/00* (2006.01)

(52) U.S. Cl.
CPC ............ *C12M 27/06* (2013.01); *C12M 23/14* (2013.01); *C12M 23/48* (2013.01); *C12M 29/06* (2013.01); *C12M 29/10* (2013.01)

(58) Field of Classification Search
None
See application file for complete search history.

(56) References Cited

U.S. PATENT DOCUMENTS

| | | | |
|---|---|---|---|
| 9,683,208 B2 | 6/2017 | Stadler | |
| 2009/0219780 A1* | 9/2009 | Castillo | C12M 27/02 366/132 |

(Continued)

FOREIGN PATENT DOCUMENTS

| | | |
|---|---|---|
| CN | 103391994 A | 11/2013 |
| CN | 105531004 A | 4/2016 |

(Continued)

OTHER PUBLICATIONS

International Search Report and Written Opinion of PCT/EP2020/066758, Mailed Sep. 9, 2020, 11 pages.

(Continued)

*Primary Examiner* — Michael A Marcheschi
*Assistant Examiner* — Ashley Lopezlira
(74) *Attorney, Agent, or Firm* — Eversheds-Sutherland (US) LLP

(57) ABSTRACT

A bioreactor support system configured to hold a bioreactor bag, comprising: a base module comprising an impeller drive unit; and at least two vessel units of different sizes, which are configured to support and substantially enclose a side wall of a bioreactor bag when a bioreactor bag is provided in the bioreactor support system, wherein the base module and the vessel units comprise mating connection devices such that the vessel units can be connected to one and the same base module and such that the impeller drive unit of the base module can be used to drive an impeller in a bioreactor bag when a bioreactor bag is provided in the bioreactor support system.

14 Claims, 5 Drawing Sheets

(56) References Cited

U.S. PATENT DOCUMENTS

| | | | | |
|---|---|---|---|---|
| 2015/0029815 A1* | 1/2015 | Gebauer | ............... | B01F 35/451 |
| | | | | 366/144 |
| 2016/0304824 A1* | 10/2016 | Mahajan | ................ | C12M 23/48 |
| 2018/0126344 A1* | 5/2018 | Akerstrom | ............ | B01F 33/453 |
| 2018/0186669 A1* | 7/2018 | Anker | ................... | C02F 3/2806 |
| 2019/0015799 A1* | 1/2019 | Gebauer | ................ | C12M 23/14 |
| 2019/0054432 A1* | 2/2019 | Bachellier | ........... | B01F 27/1134 |

FOREIGN PATENT DOCUMENTS

| | | | |
|---|---|---|---|
| CN | 107438478 A | 12/2017 | |
| WO | 2008101125 A1 | 8/2008 | |
| WO | 2017194652 A1 | 11/2017 | |

OTHER PUBLICATIONS

CN Office Action and Search Report of CN Application No. 202080046001.3, Mailed Aug. 2, 2023, 16 pages.

* cited by examiner

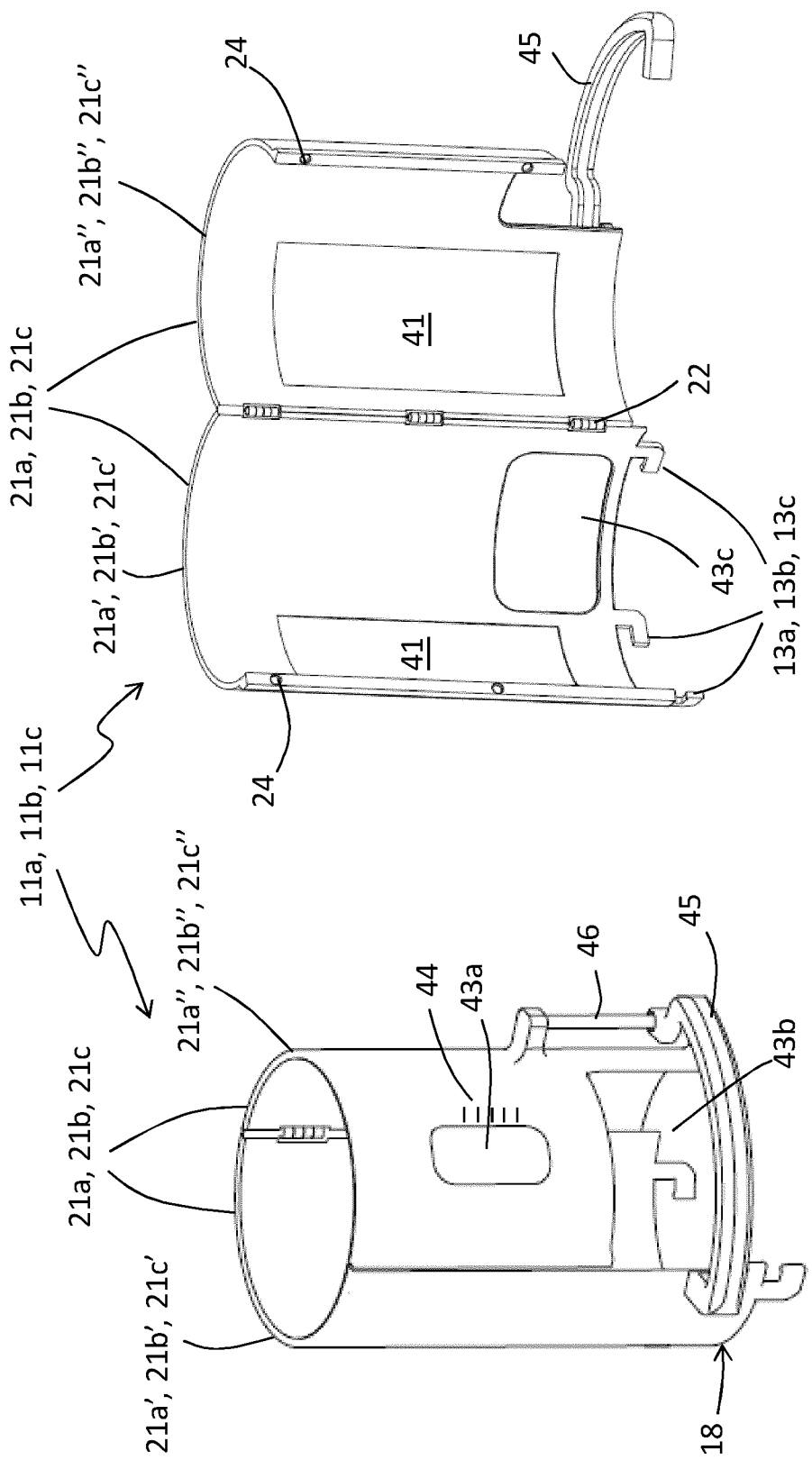

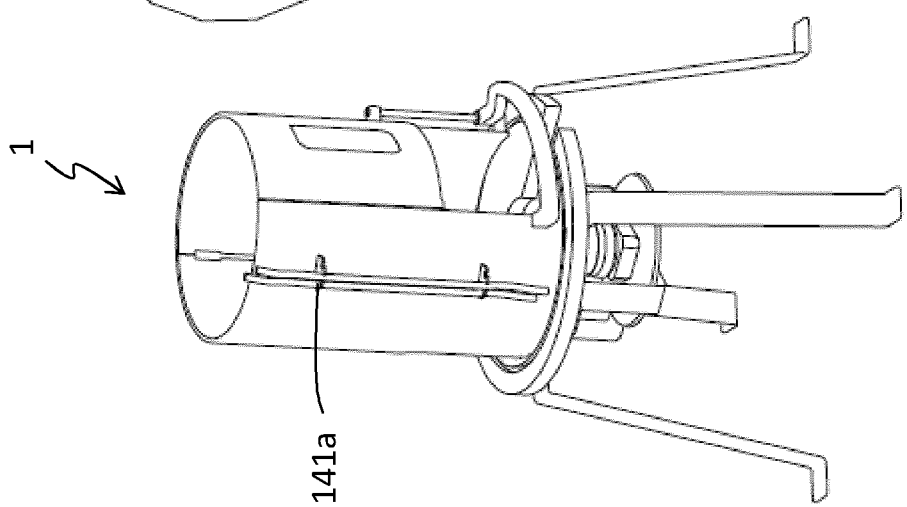
FIG. 6a
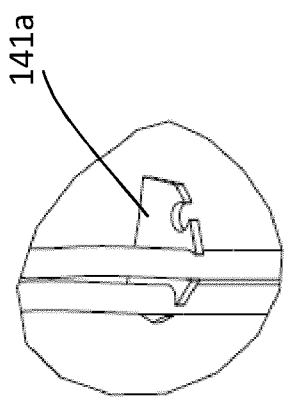
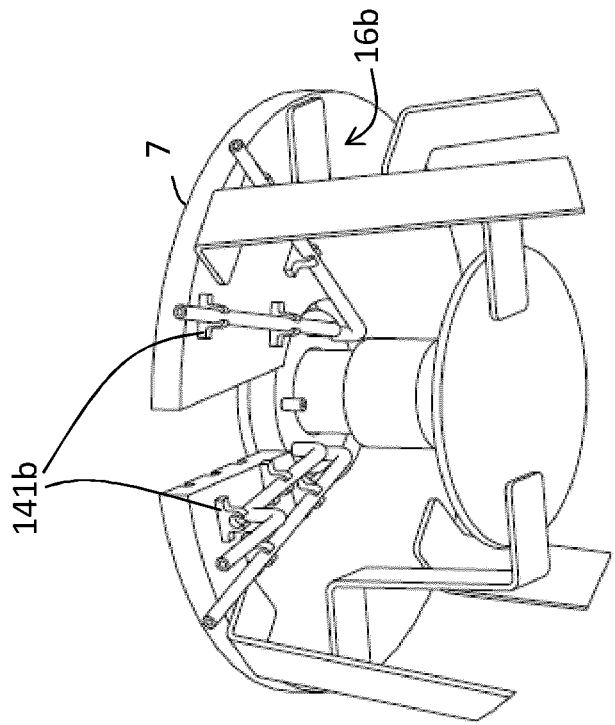
FIG. 6b

BIOREACTOR SUPPORT SYSTEM

CROSS REFERENCE TO RELATED APPLICATIONS

This application is a National Phase Application of PCT/EP2020/066758, filed on Jun. 17, 2020, which claims the benefit of IN 201911025054 filed on Jun. 24, 2019, the entire contents of which are incorporated by reference herein.

TECHNICAL FIELD OF THE INVENTION

The present invention relates to a bioreactor support system configured to hold a bioreactor bag, a bioreactor system comprising such a bioreactor support system, a base module of such a bioreactor support system and to a method for culturing cells in such a bioreactor system.

BACKGROUND

A bioreactor can typically be used for a range of different cell culture volumes. A maximum working volume for a bioreactor is the maximum volume of cell culture which the bioreactor can handle and a minimum working volume for a bioreactor is the minimum volume of a cell culture which the bioreactor can handle. The maximum and minimum working volumes depend on both the size of the bioreactor bag and on the position of impeller and sensors within the bag. The ratio between maximum working volume and minimum working volume for a bioreactor is called Turn-Down ratio. An example of a Turn-Down ratio for a bioreactor can be 5:1, i.e. for example a maximum working volume of 10 liter and a minimum working volume of 2 liters. A larger span of working volume may be wanted and would be advantageous for customers who want to use a bioreactor both for lab scale and process and production scale. For large bioreactor bags there are limitations for how small the minimum working volume can be because of the position of impeller and sensors.

SUMMARY

An object of the present invention is to provide a bioreactor system and a method for culturing cells which can handle a wide range of cell culture working volumes.

This is achieved by a bioreactor support system, a bioreactor system, a base module of a bioreactor support system and a method for culturing cells according to the independent claims.

According to one aspect of the invention a bioreactor support system configured to hold a bioreactor bag is provided, said bioreactor support system comprising:
- a base module comprising an impeller drive unit; and
- at least two vessel units of different sizes, which are configured to support and substantially enclose a side wall of a bioreactor bag when a bioreactor bag is provided in the bioreactor support system,
- wherein said base module and said at least two vessel units comprise mating connection devices such that the at least two vessel units can be connected to one and the same base module and such that the impeller drive unit of the base module can be used to drive an impeller in a bioreactor bag when a bioreactor bag is provided in the bioreactor support system.

According to another aspect of the invention a bioreactor system comprising a bioreactor support system as defined above and at least two bioreactor bags of different sizes corresponding to the different sizes of the at least two vessel units is provided, said at least two bioreactor bags each comprising an impeller and an impeller connector.

According to another aspect of the invention a base module of a bioreactor support system which is configured to hold a bioreactor bag is provided, said base module comprising:
- at least a first vessel unit connection device and a second vessel unit connection device, wherein said first and second vessel unit connection devices are configured for connection to vessel units of different sizes, wherein said vessel units are comprised in the bioreactor support system and are configured to support and substantially enclose a side wall of a bioreactor bag when a bioreactor bag is provided in the bioreactor support system; and
- an impeller drive unit which is configured to drive an impeller in a bioreactor bag when a bioreactor bag is provided in the bioreactor support system.

According to another aspect of the invention a method for culturing cells in a bioreactor system as defined above is provided.

Hereby a bioreactor system is provided which can handle a wide range of cell culture working volumes. Hereby the bioreactor system can be used both for lab scale and for process and production. Thanks to the possibility to change between vessel units of different sizes the range of working volumes can be increased. For example a minimum working volume can be 0.5 liter and a maximum working volume can be 10 liter. The base module comprises an impeller drive unit and by keeping the same base module for connection to at least two different sized vessel units, one at the time, the same impeller drive unit is used for the different vessel units. Hereby the same stirring mechanism can be used for different sized vessel units. The ratio between impellor diameter and vessel inner diameter can be kept the same in the different vessel units. This will improve predictability for customers for scale up. The possibility to scale up and still use the same stirring mechanism and same ratio between impellor diameter and vessel inner diameter will improve predictability. The vessel units can be changed simply and quickly and the customer will get scale up possibility and predictability.

In one embodiment of the invention said base module comprises a vessel unit connection part, wherein said vessel unit connection part comprises at least a first vessel unit connection device and a second vessel unit connection device, wherein said first and second vessel unit connection devices are configured for connection to vessel units of different sizes and wherein said at least two vessel units comprise at least a first vessel unit and a second vessel unit which are of different sizes, wherein said first vessel unit comprises a first base module connection device which is configured such that it can be connected to the first vessel unit connection device of the vessel unit connection part of the base module and wherein said second vessel unit comprises a second base module connection device which is configured such that it can be connected to the second vessel unit connection device of the vessel unit connection part of the base module.

In one embodiment of the invention the at least two vessel units each comprises an essentially cylindrical side wall, wherein the cylindrical side walls of different vessel units are of different diameters.

In one embodiment of the invention, when one of the vessel units is connected to the base module the vessel unit and the base module are configured to support a bottom wall and a side wall of a bioreactor bag when a bioreactor bag is provided in the bioreactor support system.

In one embodiment of the invention the impeller drive unit is configured to provide a rotating magnetic field and wherein the base module comprises an impeller connection position where an impeller connector provided in a bioreactor bag to be provided in the bioreactor support system can be provided in a position allowing the rotating magnetic field from the impeller drive unit of the base module to drive the impeller of the bioreactor bag.

In one embodiment of the invention the base module comprises a vessel unit connection part in the form of a bioreactor bottom support plate, wherein said vessel unit connection part comprises at least first and second vessel unit connection devices and the impeller connection position which is provided as an opening, wherein the at least two vessel units are configured to be connected to an upper side of the vessel unit connection part and the impeller drive unit is provided on the opposite side of the vessel unit connection part and wherein the opening in the vessel unit connection part is configured to receive an impeller connector provided in a bioreactor bag which can be provided in the bioreactor support system such that the impeller connector can be provided in a position in relation to the impeller drive unit which position is allowing the rotating magnetic field from the impeller drive unit to drive the impeller of the bioreactor bag.

In one embodiment of the invention at least one of the vessel units comprises an essentially cylindrical side wall which comprises a part of the side wall which can pivot outward such that an opening into an interior of the vessel unit can be provided for loading a bioreactor bag into the bioreactor support system.

In one embodiment of the invention at least one of the vessel units comprises an essentially cylindrical side wall which is divided into a first side wall part and a second side wall part which each comprises essentially a half cylindrical wall, optionally comprising openings for external access to an interior of the vessel units, where the first side wall part comprises the base module connection device and is configured to be connectable to the base module while the second side wall part is pivotally connected to the first side wall part such that the second side wall part can pivot into at least one open position allowing access into an interior of the vessel unit and one closed position in which the first and second side wall parts together form the essentially cylindrical side wall.

In one embodiment of the invention at least one of the vessel units comprises one or more flexible heater pads on an inner surface of a side wall, which flexible heater pads are configured to heat a bioreactor bag when a bioreactor bag is provided in the bioreactor support system.

In one embodiment of the invention at least one of the vessel units comprises at least one opening in a side wall for allowing access to a bioreactor bag when a bioreactor bag is provided in the bioreactor support system.

In one embodiment of the invention at least one of said at least one opening comprises a graduation for indication of different volumes.

In one embodiment of the invention at least one of the vessel units comprises a sensor support provided in connection with an opening in a side wall of the vessel unit, wherein the sensor support is attached to the side wall of the vessel unit such that it's position can be adjusted along a height of the vessel unit.

In one embodiment of the invention the method is a scale-up procedure where the different sizes of bioreactor bags and vessel units can be used for the cell culture during scale-up.

In one embodiment of the invention the method is a perfusion process.

BRIEF DESCRIPTION OF THE DRAWINGS

FIG. 2a shows schematically a vessel unit of the bioreactor support system as shown in FIGS. 1a-1c in a closed position.

FIG. 2b shows schematically the same vessel unit as shown in FIG. 2a but in an open position.

FIGS. 6a and 6b show a vessel unit and base module according to one embodiment of the invention comprising tube holders.

DETAILED DESCRIPTION OF EMBODIMENTS

Figure 1C:
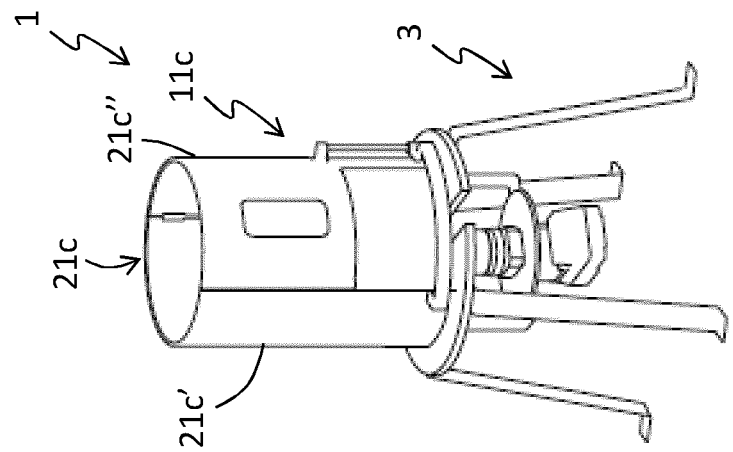
FIGS. 1a-1c show schematically a bioreactor support system according to one embodiment of the invention with three different sizes of vessel units connected.
Figure 1B:
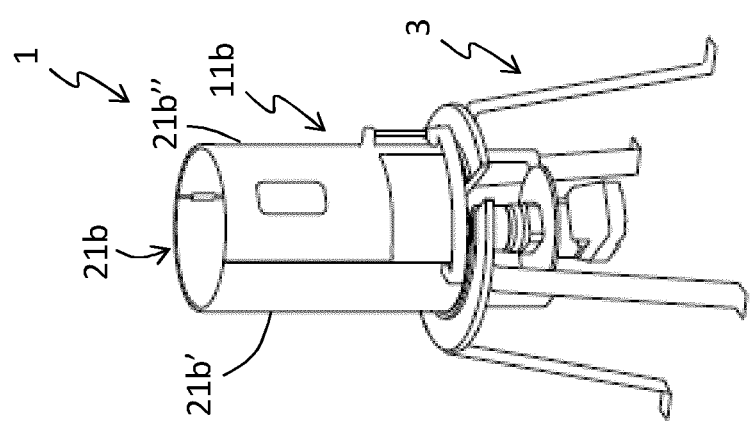
Figure 1A:
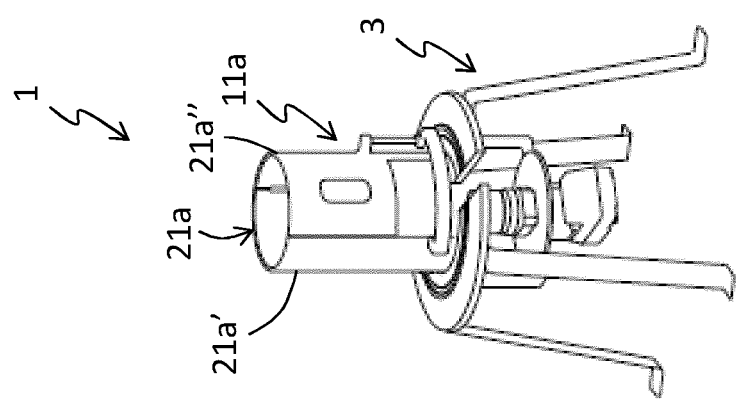

FIGS. 1a-1c show schematically a bioreactor support system 1 according to one embodiment of the invention. The bioreactor support system 1 is configured to hold a bioreactor bag and comprises according to the invention one base module 3 and at least two vessel units 11a, 11b, 11c of different sizes, which are configured to support and substantially enclose a side wall of a bioreactor bag when a bioreactor bag is provided in the bioreactor support system 1. In this embodiment of the invention three different sizes of vessel units 11a, 11b, 11c can be connected to the base module 3 however the number of vessel units can be varied.

Figure 3:
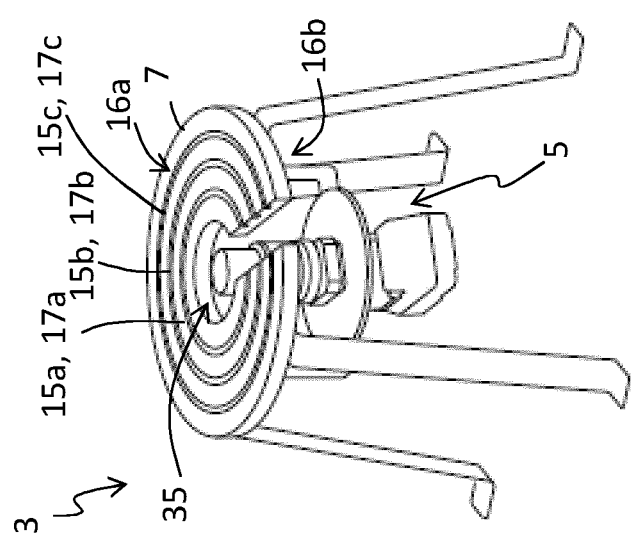
FIG. 3 shows schematically a base module of the bioreactor support system as shown in FIGS. 1a-1c.

FIG. 2a shows schematically a vessel unit 11a, 11b, 11c of the bioreactor support system 1 as shown in FIGS. 1a-1c in a closed position. This could be any one of the different sized vessel units 11a, 11b, 11c. They can suitably be designed almost the same, just being different in size. FIG. 2b shows schematically the same vessel unit 11a, 11b, 11c as shown in FIG. 2a but in an open position. FIG. 3 shows schematically the base module 3 of the bioreactor support system 1 as shown in FIGS. 1a-1c.

The base module 3 comprises according to the invention an impeller drive unit 5. Furthermore according to the invention said base module 3 and said at least two vessel units 11a, 11b, 11c comprise mating connection devices 13a, 13b, 13c, 15a, 15b, 15c such that the at least two vessel units 11a, 11b, 11c can be connected to one and the same base module 3 and such that the impeller drive unit 5 of the base module 3 can be used to drive an impeller 113a, 113b, 113c in a bioreactor bag 111a, 111b, 111c when a bioreactor bag is provided in the bioreactor support system 1. An example of a bioreactor system 101 comprising a bioreactor support system 1 according to one embodiment of the invention and a bioreactor bag 111a, 111b, 111c can be seen in FIG. 5. Different sizes of bioreactor bags 111a, 111b, 111c are used for the different sizes of vessel units 11a, 11b, 11c and furthermore different sizes of impellers 113a, 113b, 113c can be provided for the different sizes of bioreactor bags 111a, 111b, 111c. The bioreactor support system 1 according to the invention is configured for allowing connection of bioreactor bags 111a, 111b, 111c of different sizes and for allowing control of impellers 113a, 113b, 113c of different sizes which will be further described below.

The base module 3 comprises furthermore a vessel unit connection part 7, wherein said vessel unit connection part 7 comprises at least a first vessel unit connection device 15a and a second vessel unit connection device 15b, wherein said first and second vessel unit connection devices 15, 15b are configured for connection to vessel units 11a, 11b of different sizes. The at least two vessel units 11a, 11b comprise at least a first vessel unit 11a and a second vessel unit 11b which are of different sizes. In the embodiment as shown in FIGS. 1a-1c also a third vessel unit 11c is provided. Said first vessel unit 11a comprises a first base module connection device 13a which is configured such that it can be connected to the first vessel unit connection device 15a of the vessel unit connection part 7 of the base module 3 and said second vessel unit 11b comprises a second base module connection device 13b which is configured such that it can be connected to the second vessel unit connection device 15b of the vessel unit connection part 7 of the base module 3 and if a third vessel unit 11c is provided is comprises a third base module connection device 13c which is configured such that it can be connected to the third vessel unit connection device 15c of the vessel unit connection part 7.

In this embodiment of the invention the at least two vessel units 11a, 11b, 11c each comprises an essentially cylindrical side wall 21a, 21b, 21c, wherein the cylindrical side walls 21a, 21b, 21c of different vessel units 11a, 11b, 11c are of different diameters. In another embodiment the form of the vessel units may be another than cylindrical, for example square. When one of the vessel units 11a, 11b, 11c is connected to the base module 3 the vessel unit 11a, 11b, 11c and the base module 3 are configured to support a bottom wall 115 and a side wall 117 of a bioreactor bag 111 when a bioreactor bag is provided in the bioreactor support system 1; 101.

In this embodiment of the invention each of the vessel units 11a, 11b, 11c comprises an essentially cylindrical side wall 21a, 21b, 21c which comprises at least a first side wall part 21a', 21b', 21c' and a second side wall part 21a", 21b", 21c", wherein the second side wall part 21a", 21b", 21c" can pivot outward such that an opening into an interior of the vessel unit 11a, 11b, 11c can be provided for loading a bioreactor bag into the bioreactor support system. In another embodiment of the invention all the vessel units do not need to have the same design. For example one or more of the vessel units may not need to have a second side wall part which can pivot outward. The whole vessel unit can be a single part. This may be the case for more of the features which are described here. Some of the features may only be necessary for some of the vessel units, for example only for the vessel units of larger size. In the embodiment as shown in FIGS. 1a-1c however three vessel units 11a, 11b, 11c are shown having the same design.

In the embodiment shown in FIGS. 1-3 the first and second side wall parts 21a', 21a", 21b', 21b", 21c', 21c" comprises each essentially a half cylindrical wall. Each of the half cylindrical walls may comprise openings for external access to an interior of the vessel units. A production of the side wall parts 21a, 21b, 21c is facilitated by dividing the side wall parts into two half cylindrical walls. Hereby plastic injection molding of the cylindrical walls is facilitated. Any required thermoplastic material can be used for molding the vessel units. Another alternative is to produce the vessel units 11a, 11b, 11c from sheet metal by stamping or from either plastic or metal by 3D-printing or 3D printed additive.

The first and second side wall parts 21a', 21a", 21b', 21b", 21c', 21c" can be connected to each other by hinges 22 along one of the side edges. Suitably at least one of the opposite side edges of the first and second side wall parts to where the hinges 22 are provided comprises a locking device 24 such that the vessel unit side wall 21a, 21b, 21c can be locked in a closed position. The locking device 24 can for example be cooperating magnets provided on side edges of both the first and the second side wall parts 21a', 21a", 21b', 21b", 21c', 21c". Other locking devices 24 such as snap lock or external standard latches can also be used to lock the first and second side wall parts to each other in a closed position of the vessel unit 11a, 11b, 11c.

The first side wall part 21a', 21b', 21c' comprises the base module connection device 13a, 31b, 13c and is configured to be connectable to the base module 3 while the second side wall part 21a", 21b", 21c" is pivotally connected to the first side wall part 21a', 21b', 21c' such that the second side wall part 21a", 21b", 21c" can pivot into at least one open position allowing access into an interior of the vessel unit 11a, 11b, 11c and one closed position. In this embodiment the base module connection device 13a, 13b, 13c and the vessel unit connection devices 15a, 15b, 15c are designed for providing a circular lock, i.e. the base module connection devices 13a, 13b, 13c of the vessel unit 11a, 11b, 11c are inserted into the vessel unit connection devices 15a, 15b, 15c of the base module 3 and then the two parts are rotated in relation to each other for securing the connection. The vessel unit connection part 7 can be provided as a bioreactor bottom support plate, i.e. for example a circular plate or a plate of any other geometry. The vessel units 11a, 11b, 11c are connected to an upper side 16a of the vessel unit connection part 7. Grooves 17a, 17b, 17c can be provided in the upper side 16a of the vessel unit connection part 7, which grooves 17a, 17b, 17c are designed for receiving a lower edge 18 of the side walls 21a, 21b, 21c of the vessel units 11a, 11b, 11c. Hereby the mounting of the vessel units 11a, 11b, 11c to the base module 3 can be facilitated and stability of the connection can be increased. If the side walls 21a, 21b, 21c are essentially cylindrical the grooves 17a, 17b, 17c will be essentially circular.

The vessel units 11a, 11b, 11c can comprise one or more flexible heater pads 41 on an inner surface of the side wall 21a, 21b, 21c. The flexible heater pads 41 are configured to heat a bioreactor bag 111 when a bioreactor bag 111 is provided in the bioreactor support system 1 and they can be provided symmetrically around the bag. Silicone, polyimide or other flexible heat-resistant polymers can be used in the flexible heater pads 41 for covering the electrical heating elements, which typically are conductive fibers or films. In some embodiments the vessel units can additionally or alternatively comprise a flexible cooling jacket, where flexible tubes having water inlet and outlet are overmolded.

The vessel units 11a, 11b, 11c may suitably comprise at least one opening 43a, 43b, 43c in a side wall 21a, 21b, 21c for allowing access to a bioreactor bag 111 when a bioreactor bag is provided in the bioreactor support system 1. In the embodiment shown in FIGS. 1a-1c a first and a second opening 43a, 43b are provided in the second side wall part 21a", 21b", 21c" and a third opening 43b is provided in the first side wall part 21a', 21b', 21c'. Hereby access is provided to a bioreactor bag from different sides of the bioreactor system. One or more of the openings 43a, 43b, 43c can in some embodiments of the invention be provided with a graduation 44 for indication of different volumes.

The vessel units 11a, 11b, 11c may also comprise a sensor support 45. The sensor support 45 is provided in connection with one of the openings 43b in the side wall 21a, 21b, 21c of the vessel unit 11a, 11b, 11c. In the embodiment as shown in FIGS. 1-3 the sensor support 45 is provided outside the second opening 43b. The sensor support 45 is attached to the side wall 21a, 21b, 21c of the vessel unit 11a, 11b, 11c such that it's position can be adjusted along a height of the vessel unit. In the embodiment shown in FIGS. 1-3 a rod 46 is provided along a part of the height of the vessel unit 11a, 11b, 11c and the sensor support 45 is attached to the rod 46 such that it can be slid along the rod 46 in order to adjust the height position of the sensor support 45. The sensor support 45 can be an elongated, horizontally provided rail onto which sensors can be leaning. Sensors, such as for example pH and DO sensors are often provided protruding into a bioreactor bag and a sensor support 45 in the vessel unit 11a, 11b, 11c can be suitable for providing support and stability. In some embodiments of the invention the sensor support 45 can also swing out from the vessel unit 11a, 11b, 11c. If the sensor support 45 is attached to a rod 46 as shown in FIGS. 1-3 the sensor support 45 may rotate around the attachment point to the rod 46. The possibility to swing out the sensor support 45 from the vessel unit 11a, 11b, 11c may be advantageous when loading a bioreactor bag and/or when access is needed to a bioreactor provided within the bioreactor support system 1.

Figure 4:
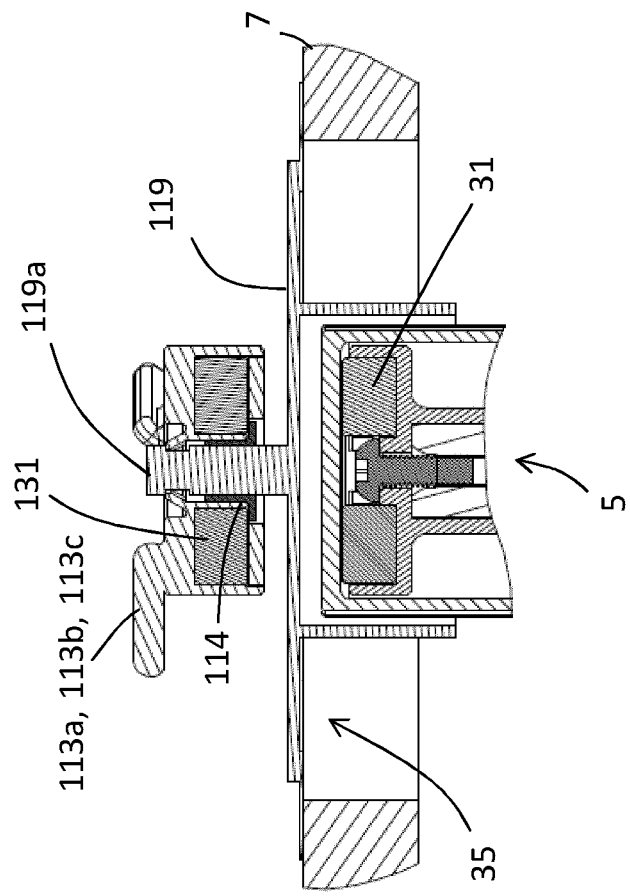
FIG. 4 shows schematically the connection between an impeller drive unit of the base module and an impeller in a bioreactor bag.

The impeller drive unit 5 is in this embodiment of the invention configured to provide a rotating magnetic field. Details of an impeller drive unit 5 according to one embodiment of the invention are shown in FIG. 4. In FIG. 4 is also shown an impeller connector 119 connected to the impeller drive unit 5. The impeller connector 119 can be welded to a single use bioreactor bag which can be provided in the bioreactor support system 1. However the bioreactor bag is not shown in FIG. 4. The base module 3 comprises an impeller connection position 35 where the impeller connector 119 can be provided in a position allowing the rotating magnetic field from the impeller drive unit 5 of the base module 3 to drive the impeller 113a, 113b, 113c of the bioreactor bag. The impeller 113a, 113b, 113c of the bioreactor bag comprises hereby a magnet 131. The impeller drive unit 5 comprises in some embodiments a magnet 31 and a motor 33 for rotating the magnet 31. In another embodiment the impeller drive unit 5 can comprise stationary coils which can be powered in a way such that a rotating magnetic field is provided.

In the embodiment shown in FIGS. 1-3 the base module 3 comprises a vessel unit connection part 7 in the form of a bioreactor bottom support plate. Said vessel unit connection part 7 comprises the vessel unit connection devices 15a, 15b, 15c and the impeller connection position 35. The impeller connection position 35 is here provided as an opening 35 where the impeller connector 119 of a bioreactor can be provided. The at least two vessel units 11a, 11b, 11e are configured to be connected to an upper side 16a of the vessel unit connection part 7 and the impeller drive unit 5 is provided on the opposite side 16b of the vessel unit connection part 7 and the opening 35 in the vessel unit connection part 7 is configured to receive an impeller connector 119 provided in a bioreactor bag 111a, 111b, 111c which can be provided in the bioreactor support system 1 such that the impeller connector 119 can be provided in a position in relation to the impeller drive unit 5 which position is allowing the rotating magnetic field from the impeller drive unit 5 to drive the impeller 113a, 113b, 113c of the bioreactor bag 111a, 111b, 111c. The impeller connector 119 need not be in contact with the impeller drive unit 5 but need to be close enough for allowing the magnetic force to influence the magnet 131 in the impeller 113a, 113b, 113c. The impeller connection position 35 which is provided as an opening 35 can be provided as a circular opening 35 in the center of the vessel unit connection part 7. The grooves 17a, 17b, 17c can be provided centered around the opening 35.

The impeller connection position 35 is provided as a big enough opening 35 for allowing different sizes of bioreactor bags to be positioned there. An impeller connector 119 can be provided as a supporting disc which is supporting the impeller 113a, 113b, 113c in its center. The impeller connector 119 comprises furthermore suitably sparger inlets. The position of the sparger inlets and the size of the impeller can suitably be different for bioreactor bags of different sizes. However the size and design of the impeller connector 119 can for all different bioreactor sizes be adapted for being suitable to position in the impeller connection position 35 such that the impeller 113a, 113b, 113c can be driven by the impeller drive unit 5. A connection between the impeller connector 119 and the impeller 113a, 113b, 113c which allows rotation is especially designed for allowing a small impeller to be provided for small bioreactor bags. The impeller 113a, 113b, 113c is connected via a bearing 114 to a central shaft 119a of the impeller connector 119. In order to maintain the same shaft diameter of the central shaft 119a for all different sizes of impellers 113a, 113b, 113c, the bearing 114 is for example provided as a sleeve bearing instead of a larger ceramic bearing, at least for the smaller impellers. For the smaller impellers there is no need for a ceramic bearing because of the small forces for the smaller bioreactors. A sleeve bearing or alternatively a miniature ceramic bearing can be provided in order to save space.

Clamps, snap connectors and other types of tube holders 141a, 141b can be provided both to the vessel units 11a, 11b, 11c as shown in FIG. 6a and to for example a bottom side 16b of the vessel unit connection part 7 of the base module 3 as shown in FIG. 6b. Hereby tubes can be secured and neatly routed instead of tangling freely from the bioreactor.

The vessel units 11a, 11b, 11c can as explained above be provided in different sizes. If for example a diameter, Dt, of the three vessels are 127 mm, 178 mm and 203 mm a range of volumes which can be handled by the bioreactor support system 1 can be 0.5-10 liter. Hereby a wide range of volumes can be handled by one single product. Hereby both lab scale and process scale can be handled by the same product. The vessel units 11a, 11b, 11c can be designed to have the same Turn Down, i.e. relation between maximum volume and minimum volume which can be handled. This Turn Down can in some embodiments of the invention be within the range of 4-6 or 4.5-5.5.

With the present invention as low working volume as 0.5 liter can be handled in a stirred bioreactor and at the same time having the same DO, pH and RTD sensors as for larger reactors. Thanks to the invention the sensors and the impeller can be positioned and used in the same way for the vessel units of different sizes. Hereby cell cultures of different working volumes can be handled in the same way which will facilitate scale up and predictability of results.

Furthermore in some embodiments of the invention the relation between impeller diameter, Di, and vessel unit diameter, Dt, Di/Dt can be kept the same for all different vessel unit sizes. This is advantageous for predictability in bioreactor processes.

In some embodiments of the invention a relation between the maximum usable height of the vessel unit, LMax, and the diameter of the vessel unit, Dt, can also be kept the same for all different vessel unit sizes.

Thanks to the invention the packaging of the bioreactor support system can be modular. Vessel units 11a, 11b, 11c and base module 3 can be packed in separate boxes for easy transport. This will reduce the risk for damages during transport.

Figure 5:
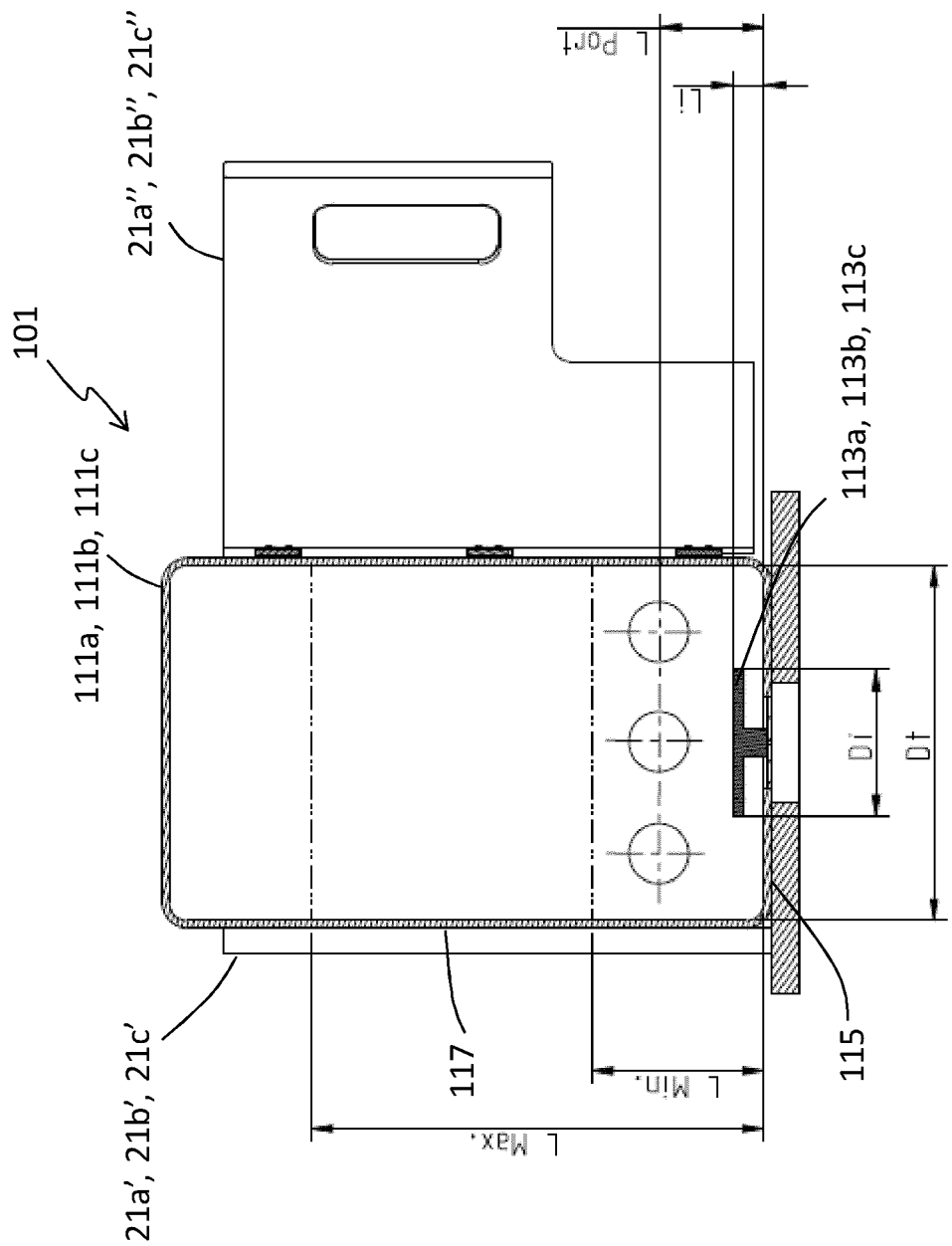
FIG. 5 shows schematically a bioreactor system comprising a bioreactor support system according to one embodiment of the invention and a bioreactor bag.

Further according to the invention a bioreactor system 101 is provided. Such a bioreactor system is shown in FIG. 5. The bioreactor system comprises a bioreactor support system 1 as described above and at least two bioreactor bags 111a, 111b, 111c of different sizes corresponding to the different sizes of the at least two vessel units 11a, 11b, 11c. Said at least two bioreactor bags 111a, 111b, 111c each comprises an impeller 113a, 113b, 113c and an impeller connector 119 as described above. The impeller 113a, 113b, 113c comprises a magnet 131 such that it can be rotated by magnetic force and a size of the impeller 113a, 113b, 113c in the bioreactor bag 111a, 111b, 111c is adapted to the size of the bioreactor bag. Hereby different sizes of impellers 113a, 113b, 113c are provided for different sizes of bioreactor bags 111a, 111b, 111c and the bioreactor support system 1 according to the invention is configured such that impellers 113a, 113b, 113c of different sizes can be used.

The impeller connector 119 of the bioreactor bag 111a, 111b, 111c is configured to be provided in a close position to the impeller drive unit 5 of the base module 3 via an impeller connection position 35 provided in the base module 3 as discussed above.

The bioreactor system according to the invention can be used for scale-up procedures, such as seed train. Connections for transferring harvest all the way from vial, through the different sizes of bioreactors provided in the bioreactor support system according to the invention and further to larger bioreactors can be provided as sterile connections. Hereby a closed loop seed train can be provided.

The bioreactor system of the invention can also be used in high density cell culture, i.e. in a perfusion process.

According to the invention a method for culturing cells in a bioreactor system as described above is also provided. The method can be a scale-up procedure where the different sizes of bioreactor bags and vessel units can be used for the cell culture during scale-up. The method can also be a perfusion process.

The invention claimed is:

1. A bioreactor support system configured to hold a bioreactor bag, said bioreactor support system comprising:
   a base module comprising an impeller drive unit, at least one circular groove, and at least two vessel unit connection devices; and
   at least one vessel unit having an essentially cylindrical side wall and at least two base module connection devices;
   wherein the at least two vessel unit connection devices provide circular locks with the at least two base module connection devices in said at least one circular groove.

2. The bioreactor support system according to claim 1, wherein when the at least one vessel unit is connected to the base module the at least one vessel unit and the base module are configured to support a bottom wall and a side wall of a bioreactor bag when a bioreactor bag is provided in the bioreactor support system.

3. The bioreactor support system according to claim 1, wherein the impeller drive unit is configured to provide a rotating magnetic field and wherein the base module comprises an impeller connection position where an impeller connector provided in the bioreactor bag can be provided in a position allowing the rotating magnetic field from the impeller drive unit of the base module to drive an impeller of the bioreactor bag.

4. The bioreactor support system according to claim 3, wherein the impeller connection position is provided as an opening in the base module, wherein the at least one vessel unit is configured to be connected to an upper side of the base module and the impeller drive unit is provided on an opposite side of the base module and wherein the opening in the base module is configured to receive the impeller connector provided in the bioreactor bag such that the impeller connector can be provided in a position in relation to the impeller drive unit allowing the rotating magnetic field from the impeller drive unit to drive the impeller of the bioreactor bag.

5. The bioreactor support system according to claim 1, wherein the at least one vessel unit comprises the essentially cylindrical side wall which comprises a part of the side wall which can pivot outward such that an opening into an interior of the at least one vessel unit is provided for loading the bioreactor bag into the bioreactor support system.

6. The bioreactor support system according to claim 1, the at least one vessel unit comprises the essentially cylindrical side wall which is divided into a first side wall part and a second side wall part which each comprise essentially a half cylindrical wall, where the first side wall part comprises the base module connection devices and is configured to be connected to the base module while the second side wall part is pivotally connected to the first side wall part such that the second side wall part can pivot into at least one open position allowing access into an interior of the vessel unit and one closed position in which the first and second side wall parts together form the essentially cylindrical side wall.

7. The bioreactor support system according to claim 6, wherein the half cylindrical wall additionally comprises openings for external access to an interior of the at least one vessel unit.

8. The bioreactor support system according to claim 1, wherein the at least one vessel unit comprises one or more flexible heater pads on an inner surface of a side wall, the one or more flexible heater pads are configured to heat the bioreactor bag when the bioreactor bag is provided in the bioreactor support system.

9. The bioreactor support system according to claim 1, wherein the at least one vessel unit comprises at least one opening in the side wall for allowing access to the bioreactor bag when the bioreactor bag is provided in the bioreactor support system.

10. The bioreactor support system according to claim 9, wherein said at least one opening comprises a graduation for indication of different volumes.

11. The bioreactor support system according to claim 9, wherein the at least one vessel unit comprises a sensor support provided in connection with at least one opening in the side wall of said at least one vessel unit, wherein the sensor support is attached to the side wall of said at least one vessel unit such that its position can be adjusted along a height of the at least one vessel unit.

12. A bioreactor system comprising the bioreactor support system according to claim 1 and a bioreactor bag comprising an impeller and an impeller connector.

13. The bioreactor system according to claim 12, wherein the impeller comprises a magnet such that it can be rotated by magnetic force and wherein a size of the impeller in the bioreactor bag is adapted to a size of said bioreactor bag.

14. The bioreactor system according to claim 12, wherein the impeller connector of the bioreactor bag is configured to be provided in a close position to the impeller drive unit of the base module via an impeller connection position provided in the base module.

\* \* \* \* \*